Oct. 6, 1959     A. LINDSEY     2,907,844
BRAKE FLUID LEVEL INDICATOR
Filed March 5, 1957

Alfred Lindsey
INVENTOR.

United States Patent Office 2,907,844
Patented Oct. 6, 1959

2,907,844

BRAKE FLUID LEVEL INDICATOR

Alfred Lindsey, Robinson, Ill.

Application March 5, 1957, Serial No. 644,092

10 Claims. (Cl. 200—84)

This invention comprises a novel and useful brake fluid level indicator and more particularly relates to a level indicating device adapted for mounting in the filler opening of the brake fluid reservoir of a hydraulic brake system for at all times electrically indicating the adequacy or inadequacy of the supply brake fluid in the reservoir.

The principal object of this invention is to provide an electrical indicator for affording a visual indication of the level of the brake fluid in the brake fluid reservoir of a hydraulic brake system.

A further object of the invention is to provide an indicator in accordance with the preceding object which shall be so compactly constructed as to be readily applied to the brake fluid reservoir in the filler opening thereof as a replacement for the filler plug.

A further object of the invention is to provide a signalling device in accordance with the foregoing objects which shall have an improved fluid level responsive actuator for the electric switches which are operatively connected with the device and for designating the existence of an ample supply or an insufficient supply of brake fluid in the reservoir.

A still further important object of the invention is to provide a device as set forth in the preceding objects wherein the switch actuator shall have an improved guide means for vertical reciprocation of the same.

An initial important object of the invention is to provide a device as set forth in the foregoing objects wherein the switch portion of the device shall have a portable enclosing housing and wherein vent means are provided, effective through and cooperating with the enclosing housing for venting the interior of the brake fluid reservoir to the atmosphere.

Figure 1:
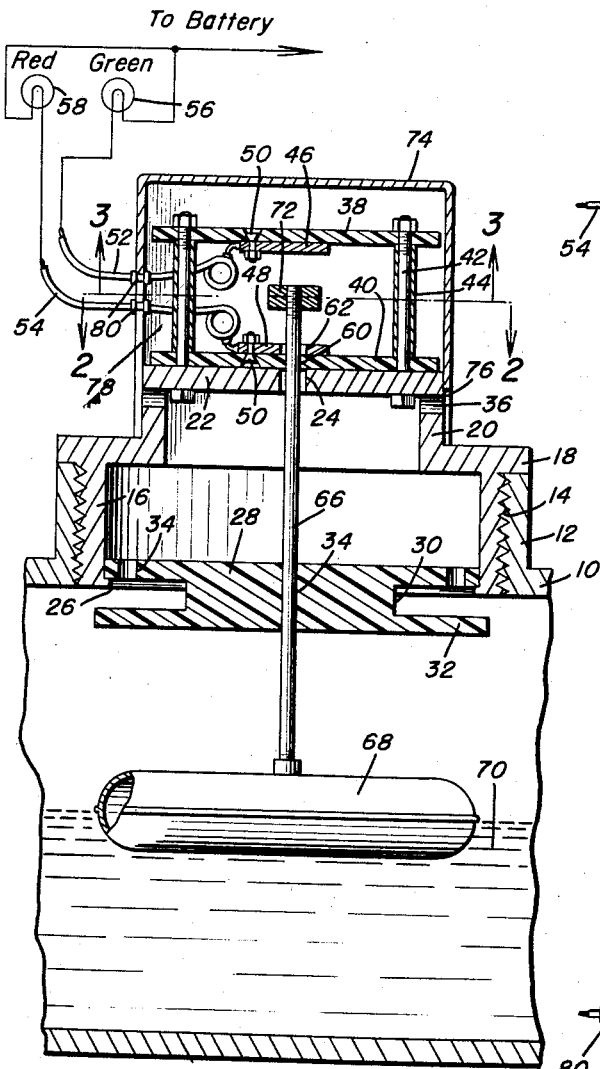
Figure 2:
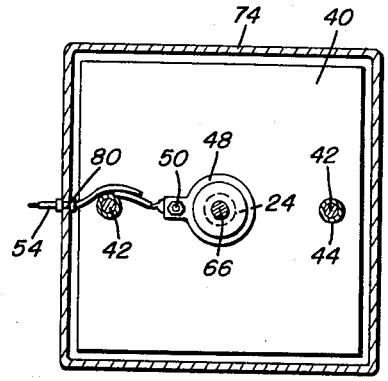
Figure 3:
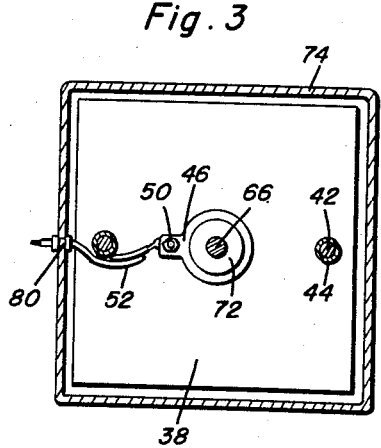

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in vertical elevation through a portion of a brake fluid reservoir showing the manner in which the indicator in accordance with this invention is applied to the filler opening of the reservoir, the position of the parts being shown when the fluid level in the reservoir is between a maximum and minimum value;

Figures 2 and 3 are horizontal sectional detail views taken substantially upon the planes indicated by the section line 2—2 and 3—3 of Figure 1 and showing portions of the switch mechanism of the device.

The dangers inherent in a condition of a hydraulic braking system for vehicles when the brake fluid level in the reservoir is dangerously low are well-known. In order to afford ample warning of such condition, the present invention provides a signalling system whose main component consists of a fluid level actuated switch adapted to be mounted in the filler plug opening of a brake fluid reservoir in place of the customary filler plug.

In the accompanying drawings the numeral 10 designates generally a portion of a fluid brake reservoir which is adapted to supply fluid to the master brake cylinder, not shown, in a conventional manner, and which reservoir is provided with a filler neck 12 which is internally threaded as at 14 for the reception of a usual filler plug, not shown. In place of this filler plug a fluid level indicator in accordance with this invention is employed.

The fluid level indicator consists of a hollow body 16 which is exteriorly threaded at its lower end for engagement in the threads 14 of the filler neck 12, this body having a laterally extending flange 18 to establish a tight seal with the top of the filling neck. Rising from the flange 18 is an upwardly extending cross sectionally reduced neck portion 20, which may conveniently be square in cross section, and which is provided at its upper end with a closed top wall 22, which top wall is provided with a centrally disposed aperture 24 for a purpose to be subsequently apparent.

The lower end of the hollow body is open, being provided with an inturned lip or flange 26 upon which is seated a metallic partition or piston 28, having a diametrically reduced dependent stem portion 30 whose lower end is provided with an enlarged laterally projecting flange 32 of greater diameter than the internal diameter of the inturned lip 26. The partition 28 in turn is provided with an aperture or opening 34 which is preferably in alignment with the opening 24 of the top wall 22.

Extending through the partition are a plurality of vent passages or openings 34 and the neck 20 adjacent the top wall 22 is provided also with laterally extending vent openings 36. The vents 34 and 36 serve to establish communication between the interior of the reservoir and the atmosphere for the purpose of venting the same.

Mounted upon the top surface of the wall 22 is an electric switch assembly forming the main component of the signalling device. For this purpose there are provided a pair of upper and lower dielectric support plates 38 and 40 which are secured in rigid relation to each other and to the top wall 22 by means of suitable fastening bolts 42, spacer sleeves 44 being provided surrounding these bolts and separating the two plates. As will be apparent from Figure 1, these bolts extend through the top wall whereby the switch assembly is rigidly secured thereto.

Secured to the adjacent surfaces of the support plates are a pair of upper and lower fixed electric contact members 46 and 48, respectively, suitable fasteners 50 being employed for the dual purpose of securing these contacts to their support plates and also for electrically connecting these contacts to electric conductors 52 and 54, respectively. Each of the electric contacts and associated conductor forms part of an electric circuit, powered from any suitable source, as from the storage battery of the motor vehicle, and by which signal lights 56 and 58 may be selectively energized in a manner to be subsequently apparent.

The lower support plate 40 is provided with a circular aperture or bore 60 extending therethrough and it will be observed that the lower contact 48 is in the form of an annulus or ring having a central opening 62 therethrough.

In order to actuate the electric switch element of the invention there is porvided an actuator rod 66 which is slidably and guidingly received in the bores 34 and 60, and is loosely received in the bores 24 and 62 out of contact therewith. At its lower end this rod is screw-threadedly engaged in any suitable float 68 which is adapted to rise and fall in response to the level of the fluid indicated at 70 and which is contained in the reservoir 10. At its upper end, the rod 66 is provided with a pair of metallic nuts 72 screw threadedly engaged upon the upper end of the rod and which nuts constitute the movable electric contact which is disposed between the upper and lower stationary contacts 46 and 48 and is adapted to cooperate therewith.

A housing or casing 74 is adapted to enclose the switch assembly and for that purpose has its open lower end adapted to frictionally engage and embrace the neck portion 20 of the hollow body. The lower portion of the side walls of the casing 74 is provided with a vertically extending slot 76 adapted to register with a vent opening 36 for establishing communication with the atmosphere through the casing or housing, and with a further elongated slot 78 in which are received grommets or bushings 80 through which pass the previously mentioned electric conductors 52 and 54.

The operation of the device is as follows: The rod 66 is guided for vertical sliding movement so that the float 68 may rise and fall in response to variations in the level of the fluid 70. When the reservoir is substantially full, the float and rod will be raised causing the movable contact 72 to engage the upper contacts 46 and thus energize the signal light 56 indicating that the reservoir is substantially full of brake fluid. As the fluid level drops in the reservoir, the fluid will also drop and the rod 66 and its movable contact will disengage the upper stationary contact thus bridging the circuit to the light 56. At this time, neither light will be energized, this condition indicating that the liquid level is above a predetermined minimum but below the full mark. When the fluid level drops to a predetermined position, indicative of the existence of or the imminent approach of an unsafe condition or an inadequate supply of brake fluid in the reservoir, the movable contact 72 will engage the lower stationary contact 48 and energize the light 58 thus signifying the existence of such condition.

The vent passages and the vent slots 76 will at all times vent the interior of the reservoir to the atmosphere thus preventing the excessive variations of pressure upon the liquid in the reservoir.

The partition 28 may be either fixedly secured in the lower end of the hollow body 16, or may be vertically slidable therein in the manner of a piston. In the former event, the passage 34 will constitute a guide for rod 66, while in the latter event the partition will be fixedly secured to the rod 66 and the partition itself by sliding action in the hollow body will constitute a guide for the actuator rod. The enlarged flange 32 by its engagement with the lower end of the hollow body will prevent undue upward travel of the partition 28 therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A brake fluid level indicator adapted for mounting in the filler opening of the brake fluid reservoir of a hydraulic brake system comprising, a hollow cylindrical body constituting a filler plug for a reservoir, said body being externally threaded and open at its lower end and having a reduced upstanding neck with a top wall at its upper end, a pair of vertically spaced upper and lower dielectric support plates, means mounting said support plates upon said top wall upon the upper surface thereof, a pair of stationary electric contacts supported on the adjacent surfaces of said support plates in vertically spaced relation, means for connecting said stationary contacts respectively to the circuits of a pair of electric signalling devices, said top wall having an aperture, an actuator rod vertically slidable through said aperture and being electrically grounded to said body and to said signalling devices, a float secured to the lower end of said rod for vertical movement thereof in response to liquid level variations in said reservoir, a movable electric contact secured to and electrically connected to the upper end of said rod and disposed between said fixed contact for alternate cooperative engagement therewith.

2. The combination of claim 1 wherein said lower support plate has an opening therein in registration with said aperture, said rod being slidably and guidably received in said opening.

3. The combination of claim 2 wherein said lower contact is annular and surrounds said rod but is out of electric contact therewith.

4. The combination of claim 1 wherein the lower portion of said hollow body has a ported guiding partition confined therein, said rod extending through and being vertically slidable and guided in said port.

5. The combination of claim 1 wherein the lower portion of said hollow body has a ported guiding partition therein, said rod extending through said port, said partition having vents therethrough establishing communication between the interior of said hollow body and the interior of said reservoir.

6. The combination of claim 1 including vent openings in the neck of said body.

7. The combination of claim 6 including a housing enclosing said support plates and embracing said neck, vents in said housing registering with said vent openings.

8. The combination of claim 7 including a ported guiding partition in the lower portion of said hollow body, said rod extending through said port, vents in said partition establishing communication between the interior of said reservoir and the interior of said hollow body.

9. The combination of claim 8 wherein said partition is fixed to said rod for vertical movement therewith and is slidably guided in said body.

10. The combination of claim 9 including a laterally extending projection on the portion of said partition lying below said body and adapted to engage the latter whereby to limit upward movement of said float and rod and close the lower end of said body.

References Cited in the file of this patent

UNITED STATES PATENTS

| | | |
|---|---|---|
| 1,207,655 | Stevens | Dec. 5, 1916 |
| 2,184,605 | Roberts | Dec. 26, 1939 |
| 2,663,772 | Cochrane | Dec. 22, 1953 |
| 2,684,414 | Kilpatrick | July 20, 1954 |
| 2,779,015 | Walker | Jan. 22, 1957 |

FOREIGN PATENTS

| | | |
|---|---|---|
| 585,643 | France | Dec. 12, 1924 |